United States Patent [19]

Charlson et al.

[11] Patent Number: 5,022,845
[45] Date of Patent: Jun. 11, 1991

[54] SEGMENTED MANDREL FOR FORMING COMPOSITE ARTICLES

[75] Inventors: Sandra M. Charlson; Steven J. Kotula; Michael R. McCloy, all of Salt Lake City, Utah

[73] Assignee: Hercules Incorporated, Wilmington, Del.

[21] Appl. No.: 343,453

[22] Filed: Apr. 25, 1989

[51] Int. Cl.[5] .............................................. B29C 33/48
[52] U.S. Cl. .................................. 425/403; 425/470; 264/313; 156/425; 249/176; 249/177; 249/63
[58] Field of Search ................ 264/313; 249/176, 177, 249/63; 425/403, 470; 156/425

[56] References Cited

U.S. PATENT DOCUMENTS

| | | | |
|---|---|---|---|
| 1,001,500 | 8/1911 | Blayney | 249/177 |
| 2,808,097 | 10/1957 | Martin | 156/425 |
| 3,279,739 | 10/1966 | Long | 249/177 |
| 3,279,741 | 10/1966 | Long | 249/177 |
| 3,345,693 | 10/1967 | McCullough | 249/63 |
| 3,652,024 | 3/1972 | Setnik | 156/425 |
| 4,213,641 | 7/1980 | Bennett | 156/425 |
| 4,288,277 | 9/1981 | Siilats | 156/425 |
| 4,364,894 | 12/1982 | Mayumi | 156/425 |
| 4,448,628 | 5/1984 | Stott | 249/184 |
| 4,717,330 | 1/1988 | Sarh | 249/184 |

*Primary Examiner*—Jay H. Woo
*Assistant Examiner*—Jeremiah F. Durkin, II
*Attorney, Agent, or Firm*—David Edwards

[57] ABSTRACT

A segmented mandrel is adapted for use in fabricating large diameter, light weight articles (such as aircraft component structures) made of thermosetting composite materials by placing fiber on the external surface of the mandrel followed by autoclave curing of the composite materials. The segmented mandrel is composed of a center shaft extending lengthwise through the mandrel, four mandrel segments mating together along a seam between their respective adjacent edges, T-stiffeners for fastening the mandrel segments together, and bulkheads rigidly mounted around the shaft and connected to the stiffeners. This segmented mandrel is reusable, is easily assembled and disassembled, and has a system that creates a vacuum seal between mandrel sections while at the same time retains the functions of support and alignment of the mandrel segments carrying the parts being cured.

7 Claims, 11 Drawing Sheets

SEGMENTED MANDREL FOR FORMING COMPOSITE ARTICLES

This invention relates to tooling and methods useful in fabricating large diameter, light weight articles such as aircraft duct structures made of thermosetting composite materials. This invention, more particularly, relates to a mandrel construction adapted for use when fiber placing followed by autoclave curing of the composite materials is employed in manufacturing thermoset composites of select character. Still more particularly, this invention concerns mandrel construction when the shape of the composite structure causes the mandrel to become trapped within the cured composite structure.

Advanced composite materials such as carbon fiber in an organic matrix are widely accepted now as promising corrosion resistant structures with two to three times the strength and stiffness of structures made of metals like aluminum while weighing roughly twenty-five percent less. Consequently, advanced composite materials are emerging as advantageous for use in producing a variety of aircraft primary structures, e.g. flaperons, empennages, air ducts, tail sections, fuselage components, wing sections, etc. The use of these materials in constructing such structures necessitates, however, development of manufacturing techniques economically suited to matching the production volumes involved while also having the precision and reliability consistent with demands of newer aircraft designs.

"Fiber placement or placing," a terminology used to describe procedures permitting automated fiber placement of filaments at zero and any other desired angle and band width, is, for example, being intensively developed currently, e.g. see U.S. Ser. No. 275,313, filed Nov. 23, 1988, so as to improve the manner in which composite materials are layed up in forming composite preforms.

Integration of composite structures i.e., manufacturing techniques that allow for fiber placement over large areas of a composite structure being manufactured, has long been understood as advantageous over techniques that require fastening together of separately cured composite parts of the structure. However, since aircraft composite structures optimally have a density necessitating curing under heat and high pressure in an autoclave, curing under such conditions creates complications in mandrel selection. For example, mandrel removal after fiber placement and cure of larger, complex shaped structures becomes a major concern. Moreover, consideration of the coefficient of thermal expansion of the material used to make the mandrel also becomes important. Still further, other concerns include the precision to which the mandrel surface may be configured and the ease in making such mandrels.

The approach of using reusable mandrels that remain joined together during fiber placement but are disassembled after cure for removing them from the cured composite structures is known. When using these mandrels in autoclave curing operations, however, the seams between joined segments can provide paths for leakage between interior and exterior surfaces of the mandrel. Previous solutions used in overcoming the problem of leak paths being created between joined mandrel sections have included use of filler putty comprising silicone rubber or the like in the seams between the mandrel sections or segments.

Now, however, in accordance with this invention, a system has been devised which eliminates the problem of leak paths being created between mandrel sections while at the same time retaining the functions of support and alignment of the mandrel sections carrying the part being cured. The invention, more particularly, is characterized as a novel mandrel assembly and comprises means and methods for sealing, supporting and aligning mandrel sections and as a process for fabricating composite structures using the mandrel novel assembly.

DETAILED DESCRIPTION OF PREFERRED EMBODIMENTS

Figure 1:
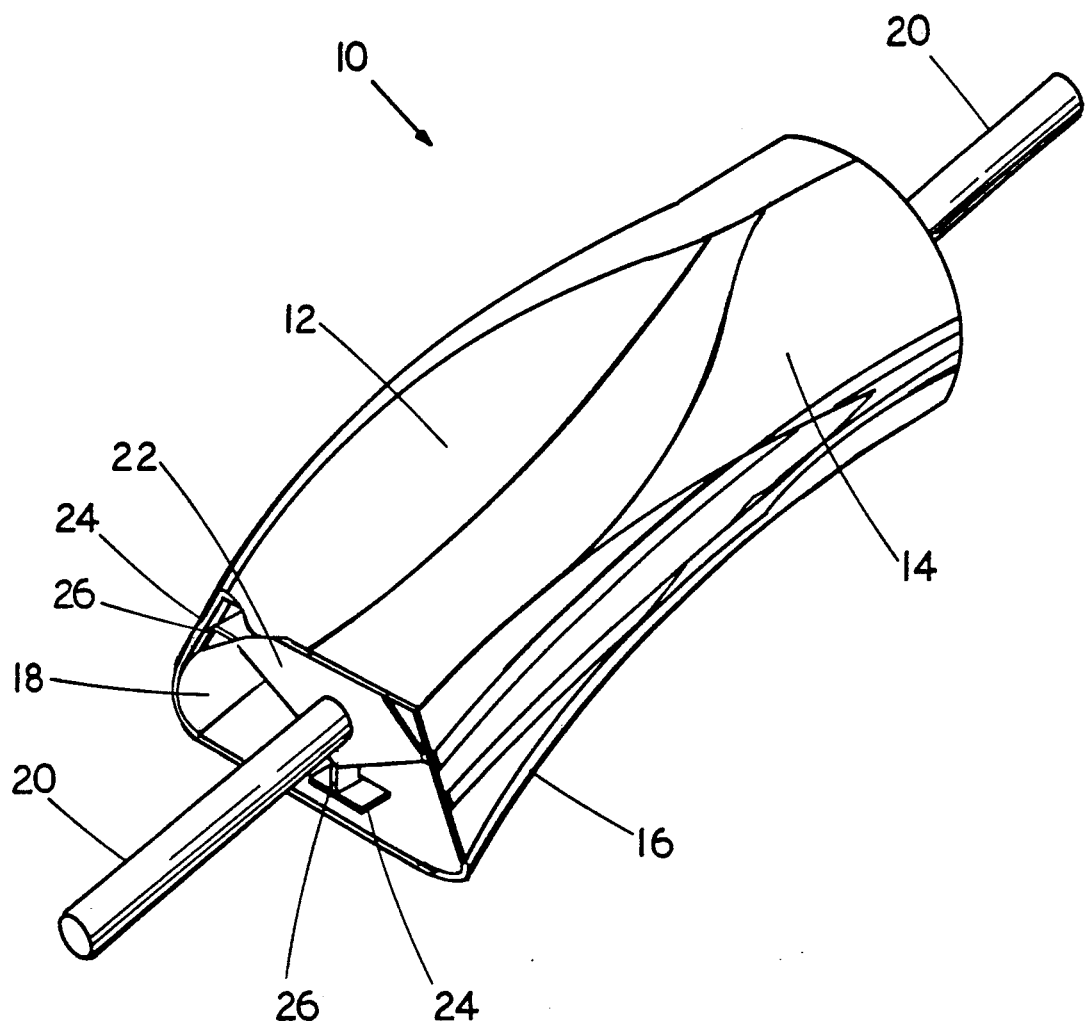
FIG. 1 shows mandrel 10 having T-stiffeners for sealing off its outer surface and for aligning, joining and fastening mandrel quarter sections 12, 14, 16, 18.

FIG. 1 schematically depicts mandrel 10 of this invention. Mandrel 10 is made from four contoured quarter sections 12, 14, 16 and 18 which form the surface of mandrel 10. Quarter sections 12, 14, 16 and 18 are made of composite comprising carbon fiber or other high strength filaments in a thermoset matrix but the sections could also be machined metal or monolithic graphite. (The matrix of quarter sections 12, 14, 16 and 18 has been cured at room temperature after prepreg lay-up but such sections may be made using filament winding or lay-up of prepregs that incorporate resins that cure at higher temperatures, e.g. 250° F. The use of matrix resins which cure at room temperature, however, permits the female splashes used in fabricating the quarter sections to be made from more easily worked materials.) Quarter sections made of these materials provide the surfaces of mandrel 10 with a coefficient of thermal expansion approximating the coefficient of thermal expansion of the part being fabricated on mandrel 10 more closely than metal.

Mandrel 10 further comprises steel shaft 20, bulkhead 22 and T-stiffener 24. T-stiffeners 24 shown in FIG. 1 rigidly mount to bulkhead 22 through clamps (not shown) respectively fastening to bulkhead 22. Bulkhead 22 rigidly mounts around shaft 20 for rotation of quarter sections 12, 14, 16 and 18 of mandrel 10.

Figure 2:
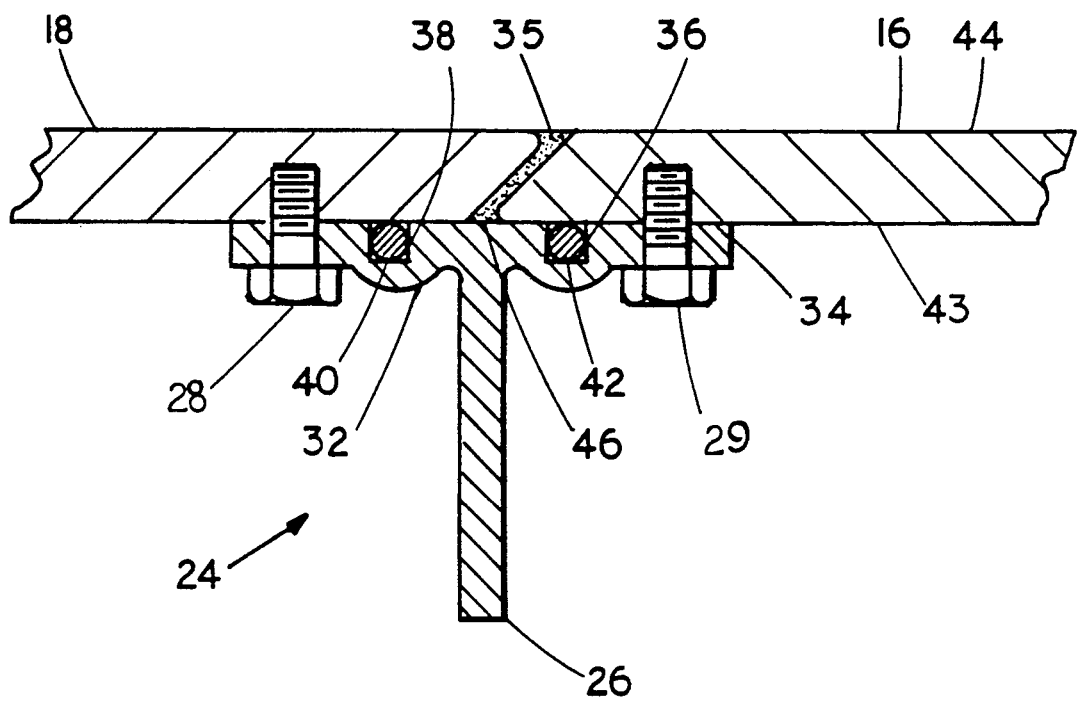
FIG. 2 is a cross section of a T-shaped stiffener of this invention.

FIG. 2 shows in cross-section T-stiffener 24 fastened to quarter sections 16, 18 of mandrel 10. T-stiffener 24 extends continuously along the length of putty filled seam 35 between quarter sections 16, 18; and it comprises leg 26 that is integral with spans 32, 34 and projects inwardly into mandrel 10. Spans 32, 34 respectively bolt to quarter sections 16, 18 by fasteners 28, 29 and have grooves 36, 38. Rubber o-rings 40, 42 fit into respective grooves 36, 38 of T-stiffener 24. Rubber o-rings 40, 42 seal the surface 43 inside of mandrel 10

(where T-stiffener 24 resides) from outer surface 44 of mandrel 10. The O-rings are shown generally cylinderical bodies in the rectilinear cross-section of grooves 36, 38 but may have any geometry suitable for sealing the mandrel sections and T-stiffener. Filler putty 46 also acts to smooth seam 35 between quarter sections 16, 18.

The T-stiffeners used in constructing mandrel 10 are layed up on female master splashes. In laying up the T-stiffeners, silicone rubber strips are placed on the female tools for molding grooves 36, 38 in T-stiffener 24 (see FIG. 2). Rectangular lengths of prepreg are layed upon each other in making the T-stiffener. Additional prepreg tow that is long and narrow is used in filling corners. The T-stiffener is cured, removed from its master splash as an integral composite body and machined to final dimensions. Fabrication of T-stiffeners is described more fully in connection with FIGS. 7A and 7B.

Figure 3:
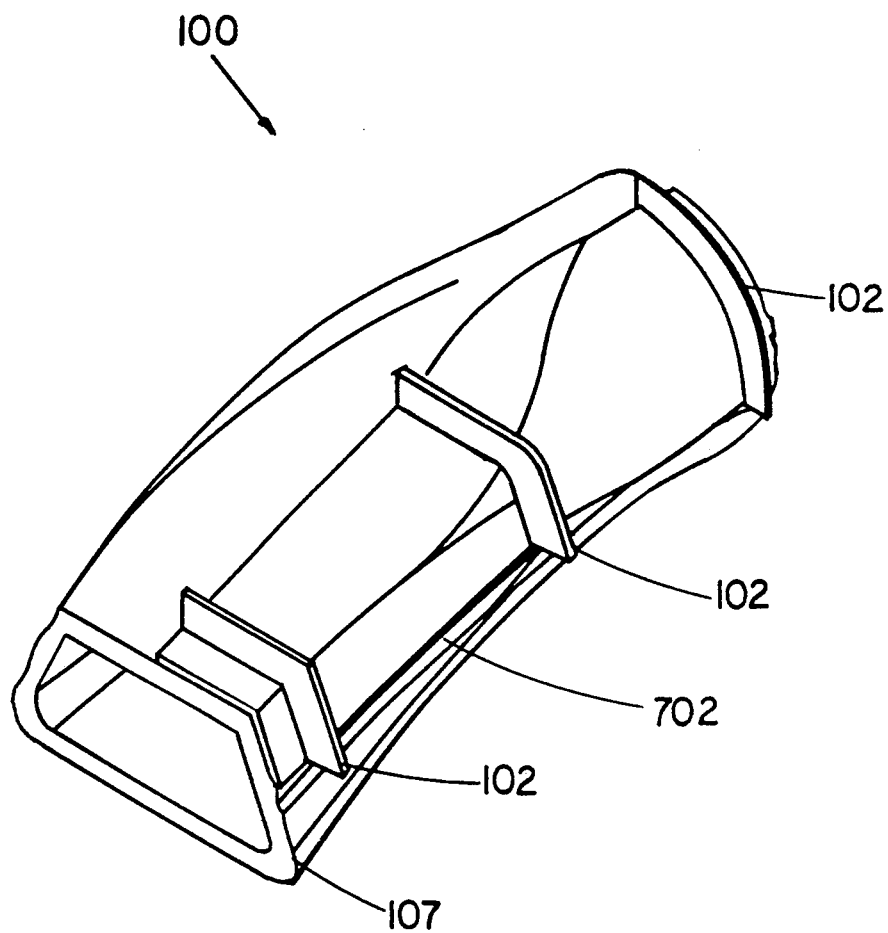
FIG. 3 shows master splash used in making the female splash for the mandrel quarter sections of this invention.
Figure 4:
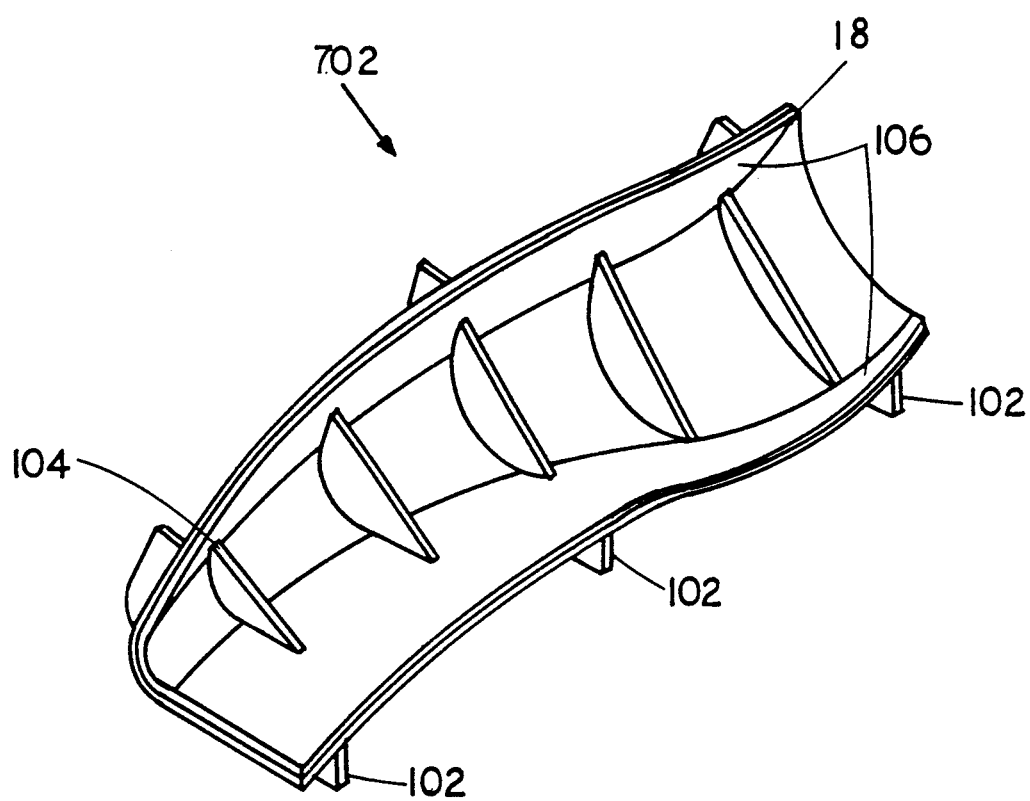
FIG. 4 shows a mandrel quarter section (shown in FIG. 1) carried within a female splash section used in forming it.

Sections 12, 14, 16 and 18 of mandrel 10 are made starting with a female master splash made from the master model (see FIGS. 7A) of the part being fabricated. FIG. 3 shows female master splash 100 which has been fabricated using this master model 107. Female master splash 100 breaks into four quarter sections. Splash supports 102 hold the splash shape and enable each of quarter sections forming splash 100 to stand on the floor or other surface while a mandrel quarter section (such as shown in FIG. 4) is fabricated. The quarter sections are preferably fabricated individually in their respective female splashes. For example, carbon fiber containing prepreg cut to desired lengths and widths is layed into the female splash and cured. When room temperature curing matrix resins are employed, the quarter section carried in the splash may be cured on the shop floor.

FIG. 4 depicts schematically mandrel quarter section 18 within a quarter section of female splash section 702. Gussets 104, added to female quarter section 18 after lay-up and initial cure thereof, assist stabilizing the shape of quarter section 18 during cure. Previously fabricated T-stiffeners (not shown) are positioned along edges 106 of section 18 for shaping the contour of these edge to the T-stiffener surface. Quarter section 18, after being cured in female splash 702, is trimmed to length and the edges 106 machined to their defined configurations for joining with quarter sections 12 and 16 made in similar fashion.

Figure 5:
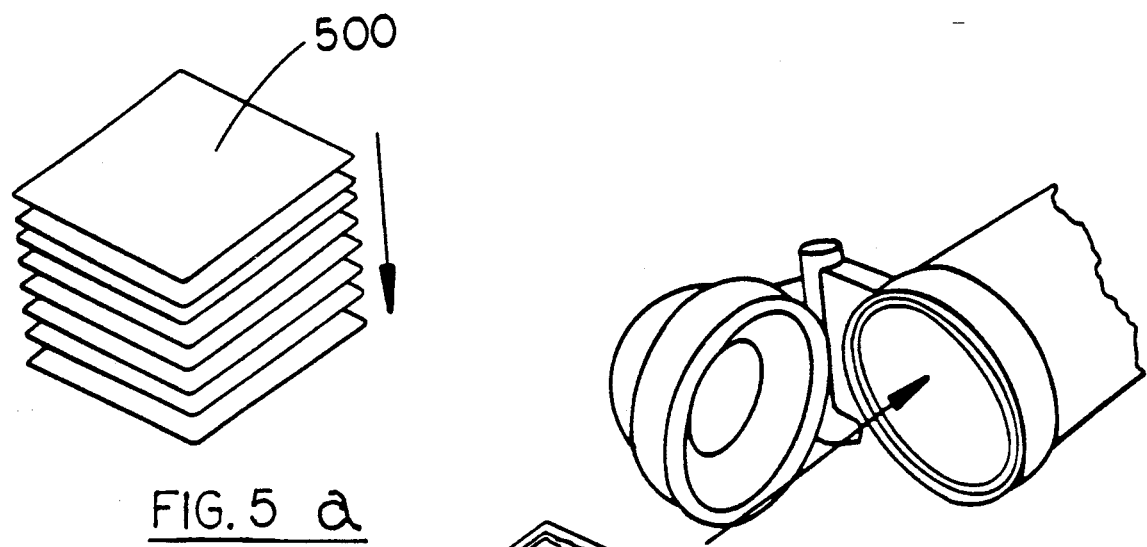
FIGS. 5a, b, c, shows bulkhead fabrication.
Figure 5:
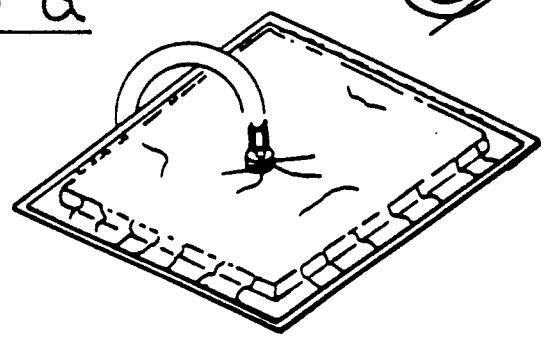
Figure 5:
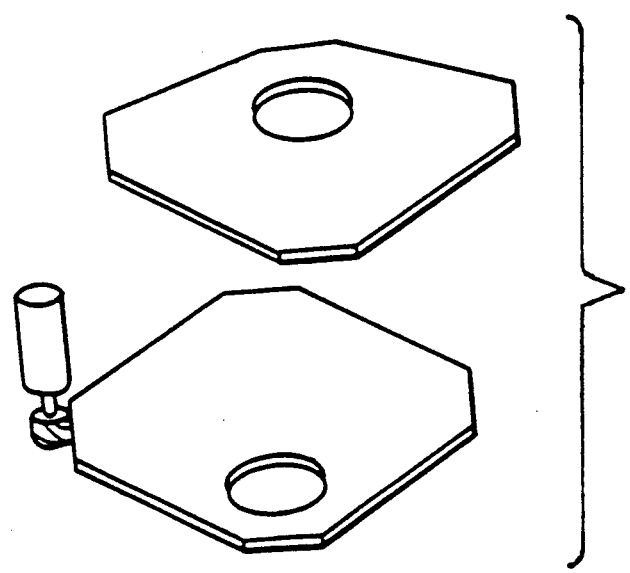

FIG. 5 shows the procedure by which the bulkheads (such as 22, FIG. 1) and gussets, by analogy, if desired, are fabricated. Prepregs made of carbon fiber or the like are first layed-up as shown in FIG. 5(a), compacted under vacuum as shown in FIG. 5(b) and cured and then machined to final dimensions as shown in FIG. 5(c). Alternatively, prepregs 500 may be precut to desired dimensions before curing.

Figure 6:
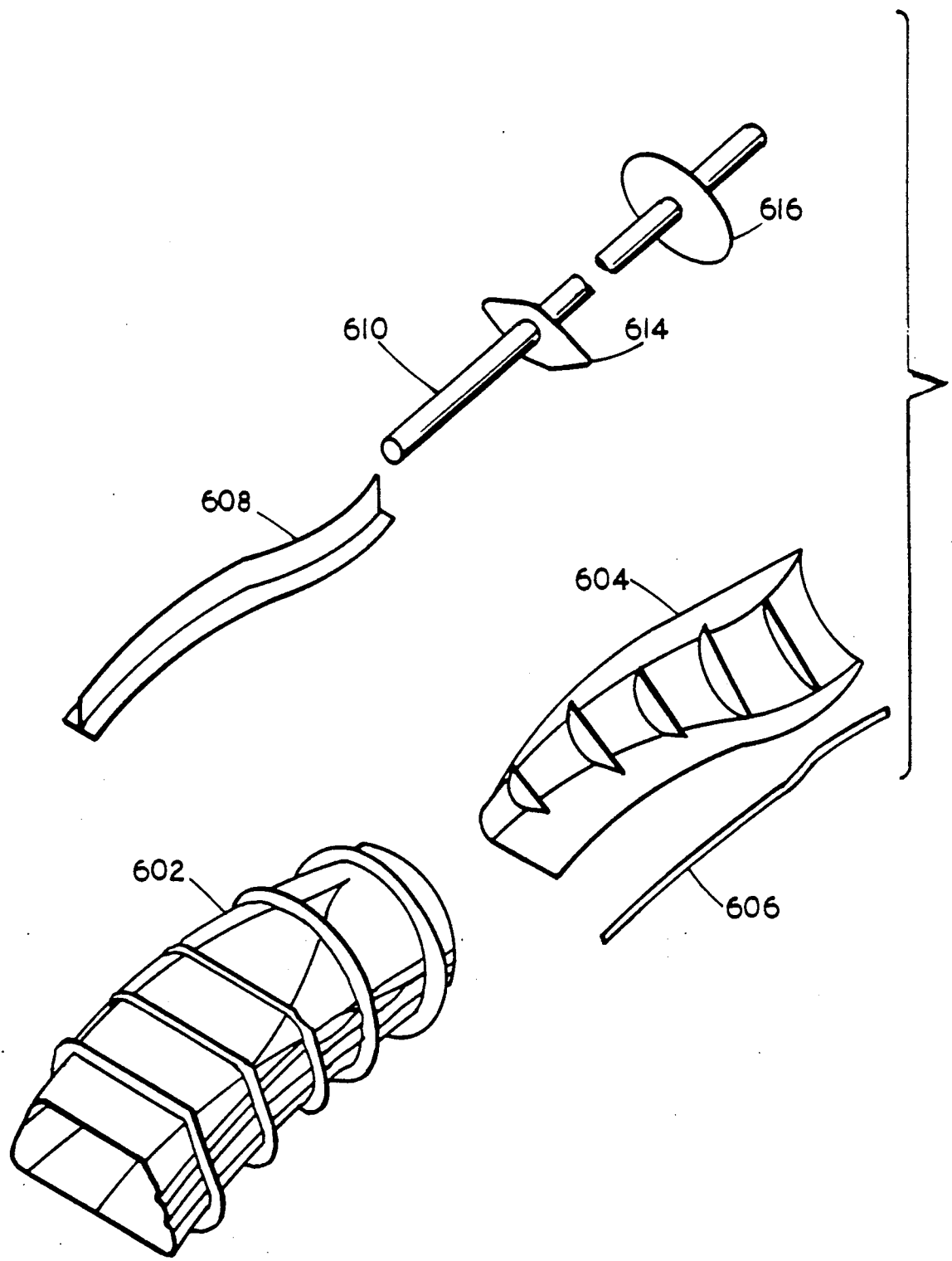
FIG. 6 shows a disassembled mandrel.

FIG. 6 illustrates a cured aircraft structure, air duct 602 and disassembled mandrel components of this invention. FIG. 6 shows cured aircraft duct 602 from which composite mandrel quarter section 604 (other quarter sections not shown), rabbit race 606, T-stiffener 608 (other three T-stiffeners not shown), shaft 610 and bulkheads 614 and 616 have been disassembled and withdrawn. (As seen in FIG. 6, T-stiffener 608 has been fabricated to extend the length of the mandrel.)

Figure 7A:
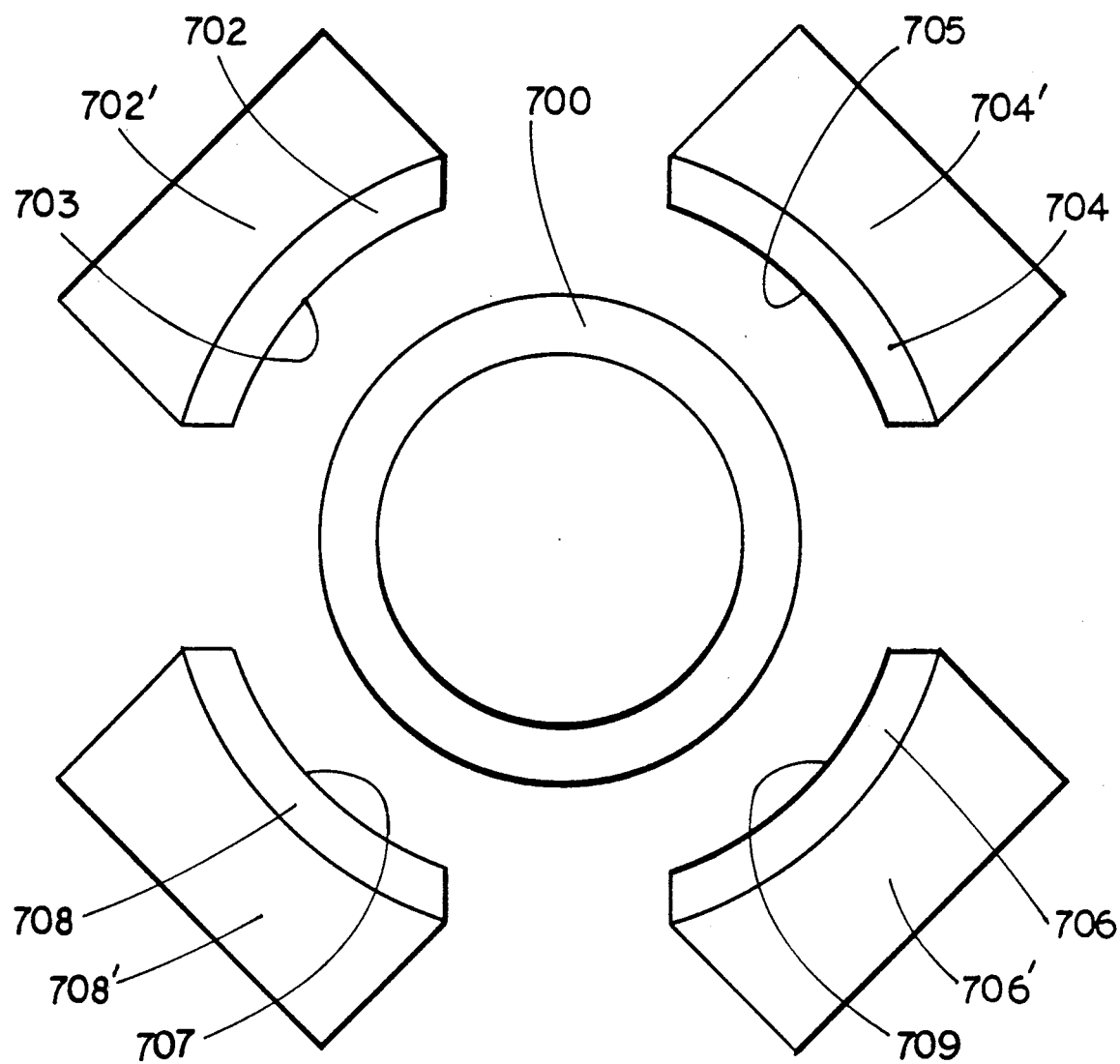
FIGS. 7A, B, C and 8A, B, C show preparation of a T-stiffener of this invention.
Figure 7B:
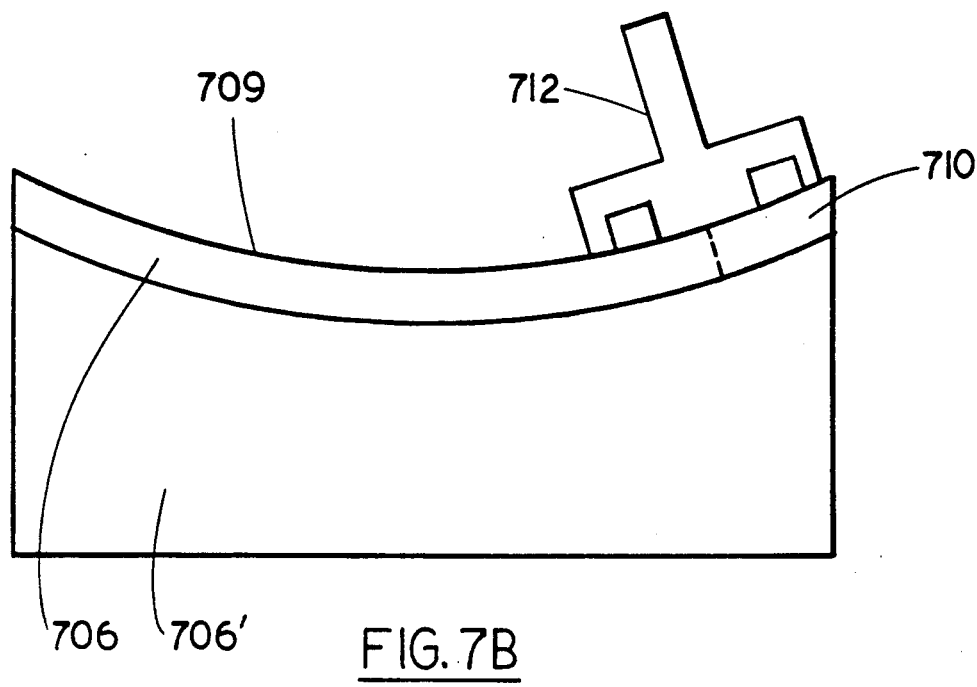
Figure 8B:
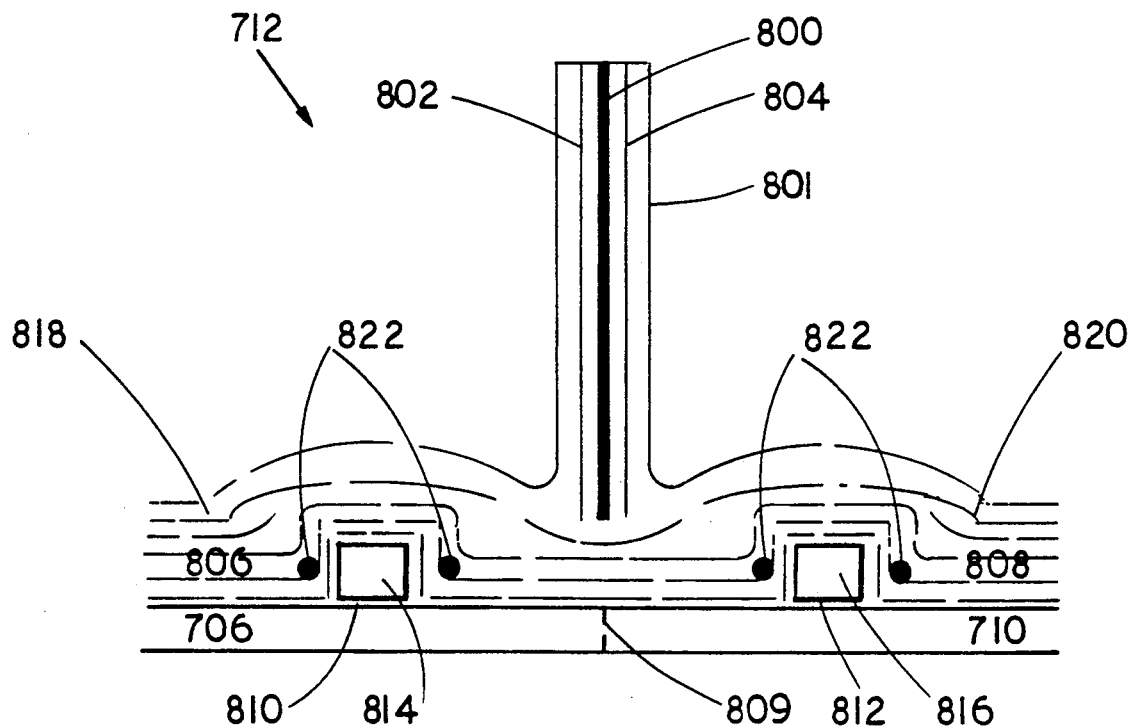
Figure 8A:
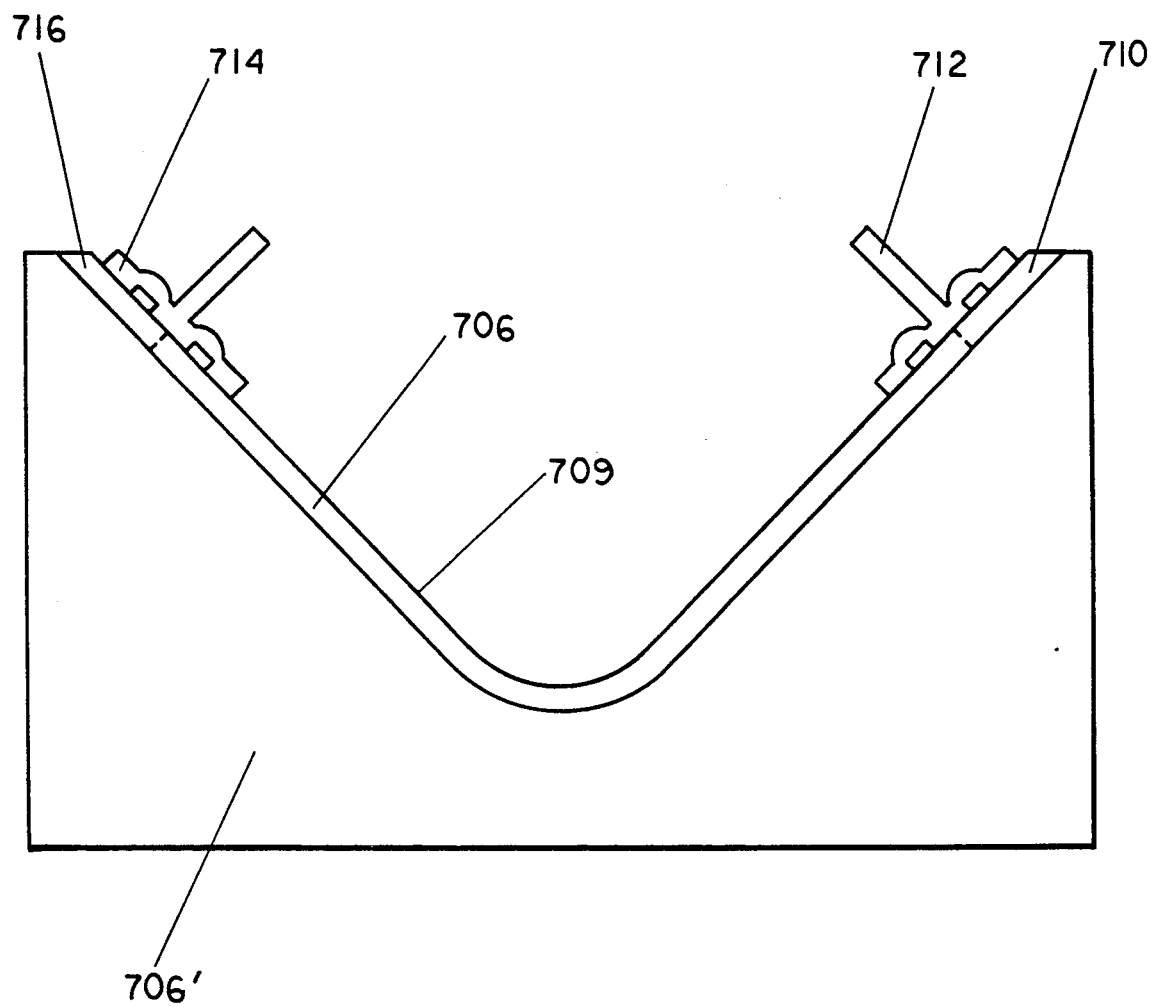

FIGS. 7A and 7B diagramatically illustrate in developed views and, FIGS. 8A and 8B illustrate also as developed views, procedures and techniques involved in making the T-stiffeners of this invention. FIG. 7A shows master model 700 in idealized cross section cut perpendicularly through its central longitudinal axis along with its associated female splashes 702, 704, 706 and 708. These splashes (a) have respective surfaces 703, 705, 707 and 709 contoured to those on the master model 700 and respective splash supports 702', 704', 706' and 708' (splashes 702, 704, 706 and 708 are used in fabricating mandrel quarter sections 12, 14, 16 and 18, e.g., splash 702 may be seen in FIG. 4).

FIG. 7B shows in diagramatic cross section splash 706 standing on splash support 706'. Splash 706 has extension 710 used in lay-up of T-stiffener 712.

As seen in FIG. 8A, T-stiffeners 712 and 714 may be fabricated using but one splash 706 with the aid of extensions 710 and 716 added to splash 706. (In alternate embodiments shown in FIG. 8C, the T-stiffeners are fabricated within a mandrel quarter section, rather than, as shown in FIG. 8A, within a splash used in fabricating a quarter section.)

In these alternative embodiments, either mandrel extensions 720 and 721 can be used or two mandrel sections are fitted together and temporarily joined together, to provide a surface for forming the T-stiffener. If extensions 720 and 721 are used, they are cut from the mandrel quarter section 18 after the T-stiffeners 712 and 714 have been layed up and cured.

Figure 8C:
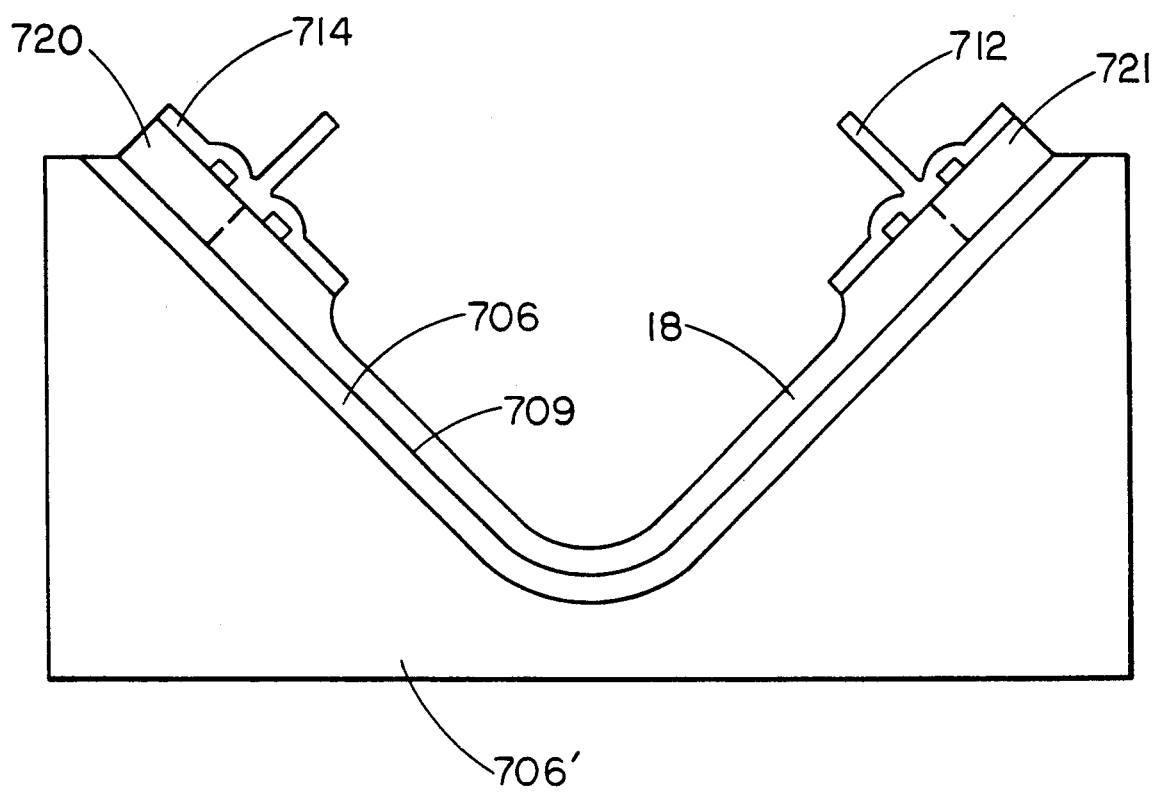

In all embodiments, the edges of the mandrel quarter section 18 under the T-stiffeners are made thicker as shown in FIG. 8C. The thicker edges allow for bolts having greater purchase to be inserted through the respective spans of the T-stiffeners.

FIG. 8B illustrates prepreg lay-up of T-stiffener 712. T-stiffener as is seen in FIG. 8B has precured, vertical composite 800 which is a thin cured graphite sheet acting as to support uncured prepreg strips 802, 804 layed up against both of its surfaces. Similarly, spans 806, 808 comprise uncured prepreg strips which are layed on the respective surfaces of extension 710 and splash 706. Prior to laying these latter strips, however, double back teflon tape sections 810, 812 are placed parallel along, but spaced from, seam 809 between extension 710 and splash 706. Upon the respective adhesive surfaces of double sections 810, 812 are then layed along silicone rubber strips 814, 816 built to form, after their removal, grooves such as 36, 38 of the T-stiffener shown in FIG. 2.

After strips 814, 816 are layed along and parallel to seam 809 the length of the splash and extension, uncured prepreg strips, butt jointed, are layed over the splash and extension surfaces as well as over built up rubber strips 814, 816.

As shown in FIG. 8B, lay-up of uncured prepreg 818, 820 forming spans 806, 808 preferably precedes lay-up of the prepreg 802, 804 of T-stiffener leg 801. As is also seen in FIG. 8B, a portion of uncured prepreg is layed across both spans 806, 808 to form a base for precured sheet 800.

Twisted prepreg tows 822 are used to fill gaps around the corners around built-up rubber strips 814, 816. After the lay-up of the prepreg in T-stiffener 712 is complete, span 706 and extension 710 carrying the layed up stiffener is cured under heat and pressure. Extension 710 is then separated and rubber strips 814, 816 then removed to open the respective grooves in the T-stiffener 712.

Figure 9:
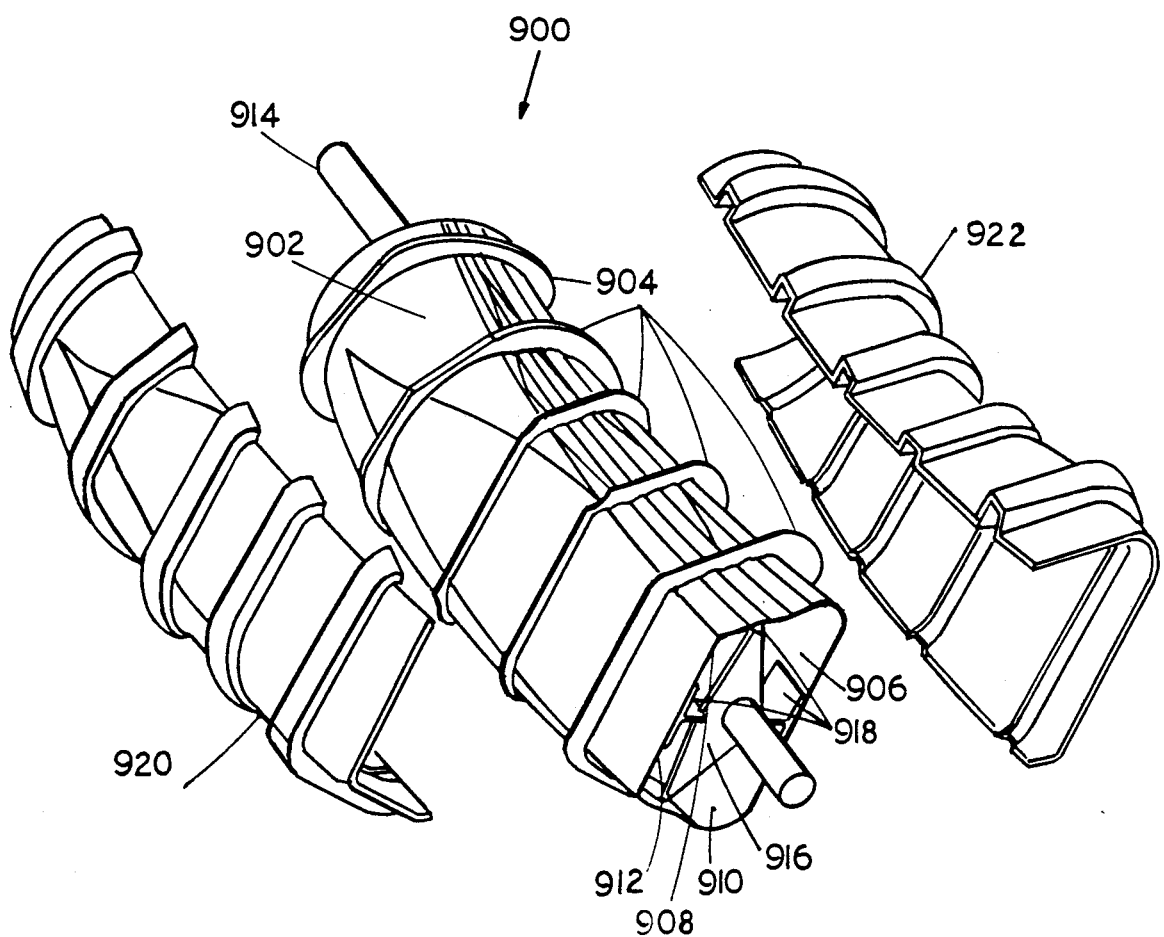
FIG. 9 shows airduct 900 with its clamshells for curing in an autoclave.

FIG. 9 shows uncured air duct 900 comprising skin 902 and staged stiffeners 904. Skin 902 has been made by fiber placement on mandrel quarter sections 906, 908, 910, 912 which are mounted around mandrel shaft 914.

Bulkheads such as 916 (others not shown) mount to shaft 914 and four T-shaped stiffeners 918 which in turn are respectively bolted (not shown) to edges of adjacent quarter sections at 906, 908, 910, 912. T-stiffeners extend the entire length of the quarter sections in aligning, sealing and fastening together the adjacent quarter sections. Rubber o-rings in grooves (neither shown) of the T-stiffener surfaces prevent leakage from within the mandrel to the outside thereof and through the fiber placement skin (i.e. continuous filaments of carbon fiber or other material in the form of tows (comprising a multitude of such filaments banded together as a tape or web). Staged stiffeners 904 are prepared separately in uncured form from prepreg (tows, comprising a multitude of filaments, which are combined with thermosetting resin into a sheet prior to lay-up) or more preferably by fiber placement using tows impregnated with thermosetting resin and combined with other tows during preferred fiber placement. Staged stiffeners 904 are then aligned on skin 902.

Clamshell halves 920, 922 molded to fit around duct 900 fasten together in sealed relation for curing duct 900 in an autoclave. Clamshell halves 920, 922 have a vacuum port connected to one or both of halves 920, 922 so as to allow evacuation and removal of volatiles during cure of duct 900. Halves 920, 922 are fabricated from composite with a skin thickness thin enough to allow reduction of pressure in clamshells 920, 922 to cause molding of the clamshell skin to the outer surface of duct 902. An open-ended cylindrical shaped bag (not shown) can surround duct 900 with its ends taped down within the quarter sections for sealing off the outer surfaces of skin 902 and stiffeners 904.

Curing in the autoclave is at pressures up to 200 psi but more commonly at pressures up to 100 psi. Curing is preferably in stages using epoxy, maleimide or the like resins well known in the art. Curing temperatures range up to 400° C. but may be higher or lower without distracting from this invention.

Having described this invention in its preferred embodiments, it will be recognized by persons skilled in this art that many variations in design and practice are feasible and that the scope of this invention is only limited by the claims appended hereto.

What is claimed is:

1. A segmented mandrel for use in shaping a fiber containing body with a curvature that necessitates, or otherwise is conducive to, disassembly of said mandrel after shaping said body around an external surface of said mandrel, said mandrel rotatable about a mandrel first axis that extends through said mandrel lengthwise along the central longitudinal axis thereof, said mandrel comprising:

a center shaft extending lengthwise along said mandrel first axis and adapted to receive rotary motion that turns said mandrel around said mandrel first axis;

first and second mandrel segments mating together along a seam between their respective adjacent edges in forming a portion of said external surface extending around said shaft;

a stiffener top section (a) engaging said first and second mandrel segments along said seam beneath said adjacent edges, (b) fastening said mandrel segments on either side of said seam through fasteners extending into said segments through said top section and (c) sealing inner and outer surfaces of said segments on either side of said seam by sealing means located respectively between (i) said fastener of said first segment and said seam and (ii) said fastener of said second segment and said seam;

a stiffener support leg integral with said top section and extending inwardly toward said shaft;

a bulkhead rigidly mounting around said shaft and to said segments for translating rotary motion from said shaft to said segments, said bulkhead is removably connected to said stiffener support leg, wherein said first and second mandrel segments have a sealant between their respective mating edges above said top section whereby said sealant and stiffener create a vacuum seal between the mandrel segments while at the same time retain the function of support and alignment of the mandrel segments.

2. The mandrel in accordance with claim 1, which comprises third and fourth mandrel segments which (a) respectively mate together with said first and second segments along second and third seams extending along said mandrel first axis and (b) mate with each other along a fourth seam extending along said mandrel first axis.

3. The mandrel in accordance with claim 2, wherein said top section comprises a pair of groves, each containing a rubber washer contacting said top section in said groove and a mandrel segment.

4. A mandrel in accordance with claim 3, which comprises at least two of said bulkheads.

5. The mandrel in accordance with claim 1, wherein said fasteners are bolts which respectively thread into said first and second mandrel segments.

6. The mandrel in accordance with claim 1, wherein said seam extends longitudinally along said mandrel first axis.

7. The mandrel of claim 2, wherein said second, third, and fourth seams have a sealant therein and along with the stiffeners create vacuum seals between the mandrel segments while at the same time retain the function of support and alignment of the mandrel segments.

* * * * *